US012272891B2

(12) United States Patent
Nakanishi et al.

(10) Patent No.: US 12,272,891 B2
(45) Date of Patent: Apr. 8, 2025

(54) TERMINAL, TERMINAL COUPLING BODY, AND BOARD CONNECTOR

(71) Applicant: SUMITOMO WIRING SYSTEMS, LTD., Mie (JP)

(72) Inventors: Yuichi Nakanishi, Mie (JP); Hidekazu Matsuda, Mie (JP); Hiroto Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 354 days.

(21) Appl. No.: 17/794,367

(22) PCT Filed: Jan. 12, 2021

(86) PCT No.: PCT/JP2021/000662
§ 371 (c)(1),
(2) Date: Jul. 21, 2022

(87) PCT Pub. No.: WO2021/153212
PCT Pub. Date: Aug. 5, 2021

(65) Prior Publication Data

US 2023/0059178 A1 Feb. 23, 2023

(30) Foreign Application Priority Data

Jan. 31, 2020 (JP) ................................ 2020-015255

(51) Int. Cl.
*H01R 12/58* (2011.01)
*H01R 12/51* (2011.01)
(Continued)

(52) U.S. Cl.
CPC ............. *H01R 13/04* (2013.01); *H01R 12/51* (2013.01); *H01R 13/41* (2013.01)

(58) Field of Classification Search
CPC ......... H01R 13/04; H01R 12/51; H01R 13/41
See application file for complete search history.

(56) References Cited

U.S. PATENT DOCUMENTS 4,746,301 A * 5/1988 Key ...................... H01R 12/58 439/82
7,070,461 B1 * 7/2006 Pavlovic ................ H01R 11/26 439/766
(Continued)

FOREIGN PATENT DOCUMENTS

JP 2005-340068 A 12/2005
JP 2012-084444 A 4/2012
(Continued)

OTHER PUBLICATIONS

International Search Report issued on Apr. 6, 2021 for WO 2021/153212 A1 (5 pages).

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A terminal 1 is made of a rectangular wire material, extends in a front-rear direction and is provided with a terminal body 2, a pair of first projections 3 provided to project toward both left and right sides from both side surfaces 2A of the terminal body 22, and a pair of second projections 4 provided to project toward both left and right sides from the both side surfaces 2. A of the terminal body 2 and disposed behind the pair of first projections 3. The pair of second projections 4 are continuously and integrally formed with the pair of first projections 3. A maximum projecting dimension X2max of the second projection 4 from the side surface 2A of the terminal body 2 is larger than a maximum projecting dimension X1max of the first projection 3 from the side surface 2A of the terminal body 2.

6 Claims, 8 Drawing Sheets

(51) Int. Cl.
*H01R 13/04* (2006.01)
*H01R 13/41* (2006.01)

(56) References Cited

U.S. PATENT DOCUMENTS

| | | | | |
|---|---|---|---|---|
| 9,172,166 | B2 * | 10/2015 | Kida | H01R 13/02 |
| 11,264,741 | B2 * | 3/2022 | Goto | H01R 13/04 |
| 2004/0242082 | A1 * | 12/2004 | Tsuchiya | H01R 12/585 439/751 |
| 2005/0250356 | A1 * | 11/2005 | Matsumura | H01R 12/585 439/82 |
| 2008/0227315 | A1 * | 9/2008 | Banno | H01R 12/58 439/82 |
| 2010/0136852 | A1 * | 6/2010 | Mito | H01R 13/41 439/733.1 |
| 2011/0021089 | A1 * | 1/2011 | Yoshida | H01R 13/28 439/733.1 |
| 2011/0201237 | A1 * | 8/2011 | Suzuki | H01R 12/585 439/884 |
| 2014/0065897 | A1 * | 3/2014 | Kida | H01R 13/02 439/889 |
| 2014/0335721 | A1 | 11/2014 | Tamamura et al. | |
| 2014/0342619 | A1 * | 11/2014 | Uchida | H01R 12/724 439/751 |
| 2015/0126064 | A1 * | 5/2015 | Kobayashi | H01R 13/5202 439/586 |
| 2015/0162698 | A1 * | 6/2015 | Hara | H01R 13/5219 439/157 |
| 2015/0380873 | A1 * | 12/2015 | Endo | H01R 12/87 439/620.22 |
| 2016/0020544 | A1 * | 1/2016 | Ohyama | H01R 13/41 439/751 |
| 2016/0164202 | A1 * | 6/2016 | Endo | H01R 12/585 439/74 |
| 2016/0197419 | A1 * | 7/2016 | Uchida | H01R 12/585 439/751 |
| 2016/0233603 | A1 * | 8/2016 | Kawagishi | H01R 43/22 |
| 2017/0054233 | A1 * | 2/2017 | Kikuchi | H01R 12/585 |
| 2017/0170593 | A1 * | 6/2017 | Uezono | H01R 13/642 |
| 2017/0222349 | A1 * | 8/2017 | Kleymann | H01R 9/03 |
| 2017/0302016 | A1 * | 10/2017 | Watanabe | C25D 5/12 |
| 2017/0310027 | A1 * | 10/2017 | Goto | H01R 12/585 |
| 2018/0062290 | A1 * | 3/2018 | Goto | H01R 12/526 |
| 2018/0062297 | A1 * | 3/2018 | Suzuki | H01R 13/422 |
| 2018/0115096 | A1 * | 4/2018 | Endo | H01R 12/7064 |
| 2018/0123267 | A1 * | 5/2018 | Goto | H01B 5/02 |
| 2018/0138610 | A1 * | 5/2018 | Goto | H01R 12/585 |
| 2019/0273338 | A1 * | 9/2019 | Oka | H01R 13/506 |
| 2019/0304802 | A1 * | 10/2019 | Naruoka | H05K 7/1432 |
| 2022/0085524 | A1 * | 3/2022 | Mitsui | H01R 4/16 |
| 2023/0059178 | A1 * | 2/2023 | Nakanishi | H01R 13/04 |
| 2023/0208064 | A1 * | 6/2023 | Sakai | H01R 13/41 439/733.1 |

FOREIGN PATENT DOCUMENTS

| | | | |
|---|---|---|---|
| JP | 2014-137975 | A | 7/2014 |
| JP | 2016-024857 | A | 2/2016 |
| JP | 2016-149337 | A | 8/2016 |
| WO | 2020/021750 | A1 | 1/2020 |

* cited by examiner

TERMINAL, TERMINAL COUPLING BODY, AND BOARD CONNECTOR

CROSS REFERENCE TO RELATED APPLICATIONS

This application is a national phase of PCT application No. PCT/JP2021/000662, filed on 12 Jan. 2021, which claims priority from Japanese patent application No. 2020-015255, filed on 31 Jan. 2020, all of which are incorporated herein by reference.

TECHNICAL FIELD

The present disclosure relates to a terminal, a terminal coupling body and a board connector.

BACKGROUND

Conventionally, a terminal holding structure in the case of press-fitting and holding a terminal in a housing is, for example, known from Japanese Patent Laid-open Publication No. 2005-340068 (Patent Document 1 below). In this terminal holding structure, a terminal provided with a front locking projection and a rear locking projection at positions different in a press-fitting direction is used. By providing a plurality of locking projections in this way, a terminal holding force can be improved.

PRIOR ART DOCUMENT

Patent Document

Patent Document 1: JP 2005-340068 A

SUMMARY OF THE INVENTION

Problems to be Solved

In the case of miniaturizing the terminal using the above terminal holding structure, it is considered to integrate the front locking projection and the rear locking projection. However, if the front and rear locking projections are continuously integrated, a holding point by the integrated locking projection is reduced to half and the terminal holding force may be reduced.

The present disclosure was completed on the basis of the above situation and aims to provide a terminal miniaturizable without reducing a terminal holding force.

Means to Solve the Problem

A terminal of the present disclosure is a terminal made of a rectangular wire material and extending in a front-rear direction and is provided with a terminal body, a pair of first projections provided to project toward both left and right sides from both side surfaces of the terminal body, and a pair of second projections provided to project toward both left and right sides from the both side surfaces of the terminal body, the pair of second projections being disposed behind the pair of first projections, wherein the pair of second projections are continuously and integrally formed with the pair of first projections, and a maximum projecting dimension of the second projection from the side surface of the terminal body is larger than a maximum projecting dimension of the first projection from the side surface of the terminal body.

Effect of the Invention

According to the present disclosure, it is possible to provide a terminal miniaturizable without reducing a terminal holding force.

DETAILED DESCRIPTION TO EXECUTE THE INVENTION

Description of Embodiments of Present Disclosure

Figure 1:
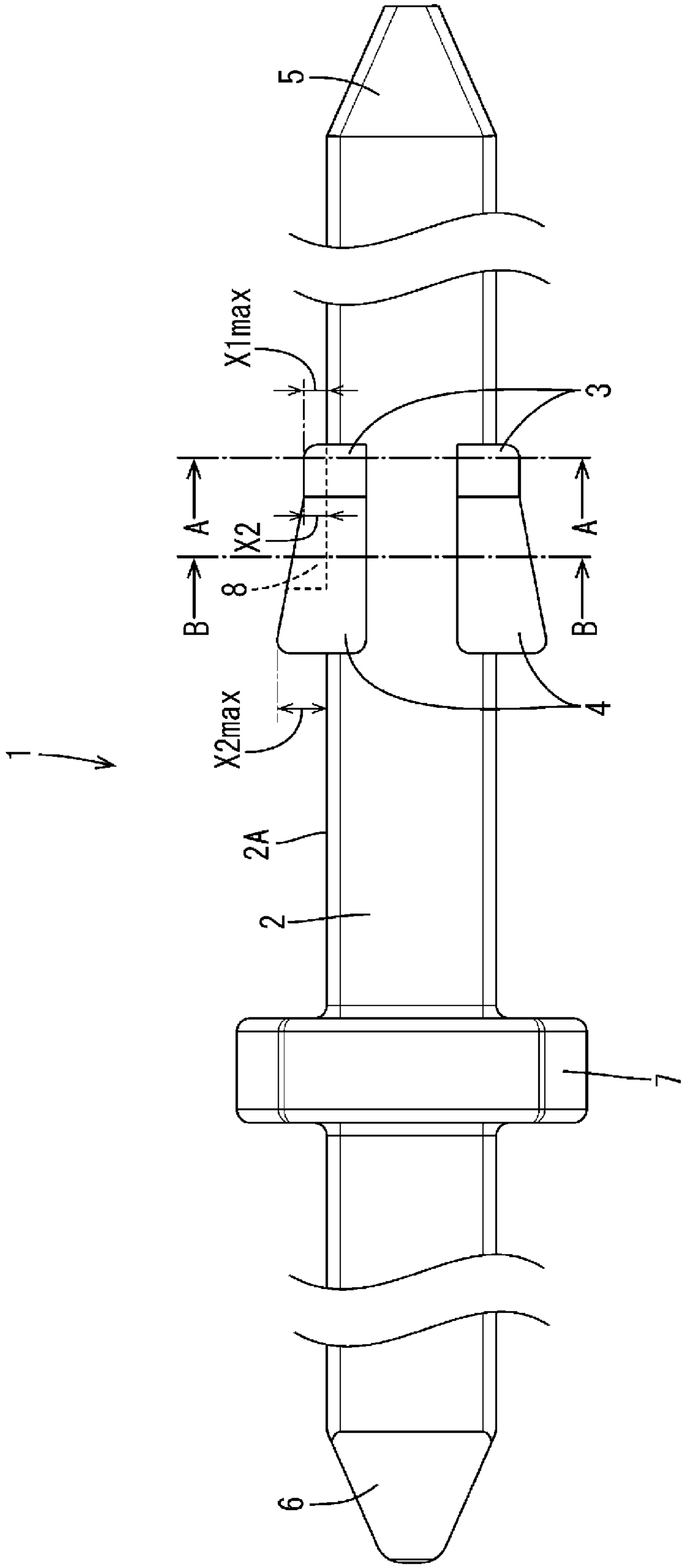
FIG. 1 is a plan view of a terminal according to an embodiment.

First, embodiments of the present disclosure are listed and described.

(1) The terminal of the present disclosure is a terminal made of a rectangular wire material and extending in a front-rear direction and is provided with a terminal body, a pair of first projections provided to project toward both left and right sides from both side surfaces of the terminal body, and a pair of second projections provided to project toward both left and right sides from the both side surfaces of the terminal body, the pair of second projections being disposed behind the pair of first projections, wherein the pair of second projections are continuously and integrally formed with the pair of first projections, and a maximum projecting dimension of the second projection from the side surface of the terminal body is larger than a maximum projecting dimension of the first projection from the side surface of the terminal body.

According to this configuration, when the terminal is press-fit into a housing and held inside the housing, the terminal can be held by the first and second projections. Further, since the first and second projections are integrated, the terminal is easily miniaturized.

(2) Preferably, the first projection includes an upper first projection located on an upper surface side of the terminal body and a lower first projection located on a lower surface side of the terminal body, the second projection includes an upper second projection continuously and integrally formed with the upper first projection and a lower second projection continuously and integrally formed with the lower first projection, and the upper and lower second projections approach each other toward a rear side and projecting dimensions thereof from the side surface of the terminal body increase toward the rear side.

According to this configuration, in press-fitting the terminal into the housing, synthetic resin scraped off from an inner wall of the housing is filled between the upper and lower second projections, whereby the terminal is more firmly held in the housing.

(3) A terminal coupling body of the present disclosure is provided with the above terminal and a terminal coupling body for holding a plurality of the terminals in parallel.

According to this configuration, the terminals are easily handled and transported.

(4) A board connector of the present disclosure is provided with the above terminal and a housing including a terminal holding wall for holding the terminal.

According to this configuration, the terminals can be firmly held in the housing during the use of the board connector. Further, since the terminals can be miniaturized, the board connector can be miniaturized or more multipolarized.

Details of Embodiment of Present Disclosure

Hereinafter, an embodiment of the present disclosure is described. The present disclosure is not limited to these illustrations and is intended to be represented by claims and include all changes in the scope of claims and in the meaning and scope of equivalents.

Embodiment

The embodiment of the present disclosure is described with reference to FIGS. 1 to 9.

Figure 7:
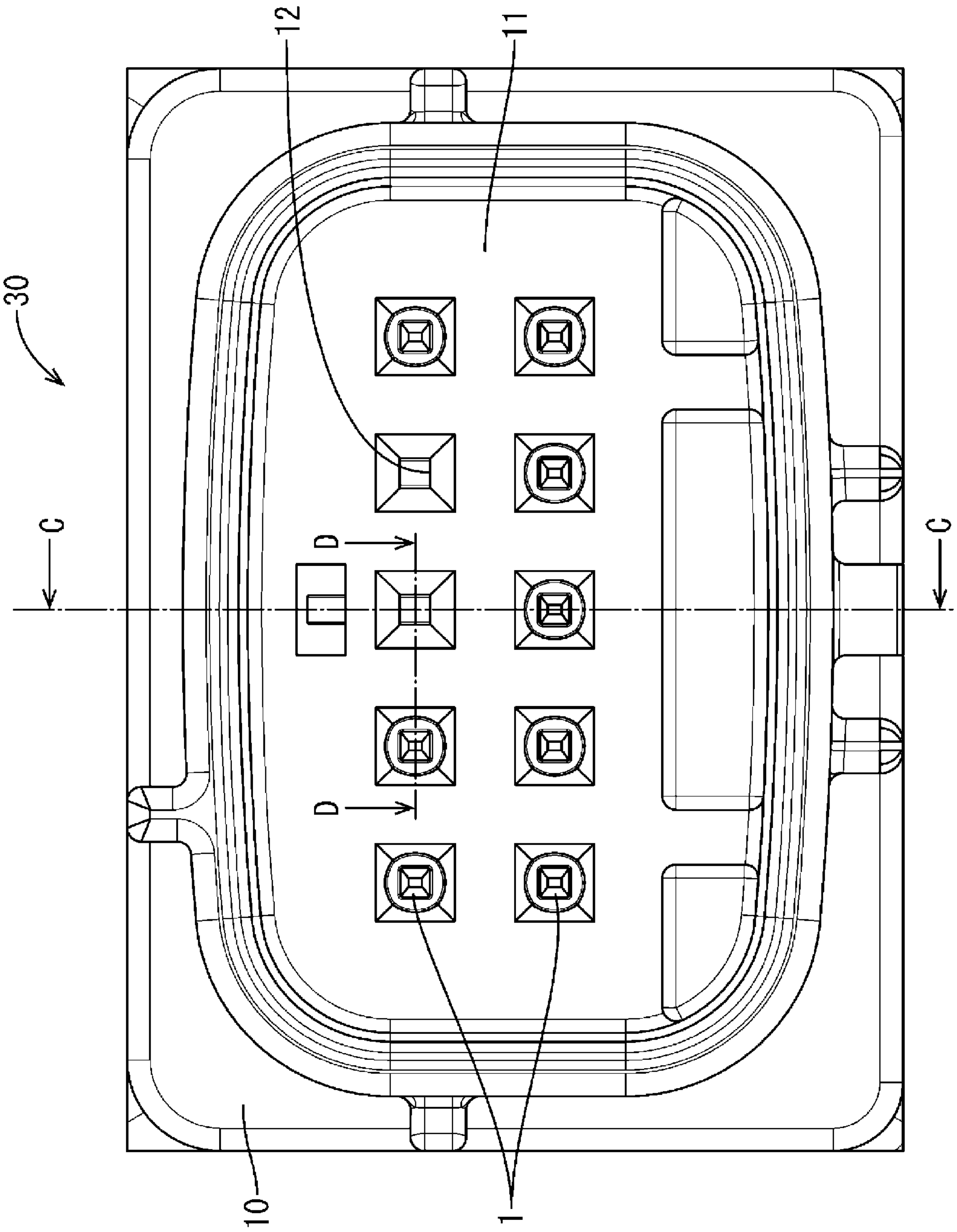
FIG. 7 is a front view of a board connector according to the embodiment.
Figure 8:
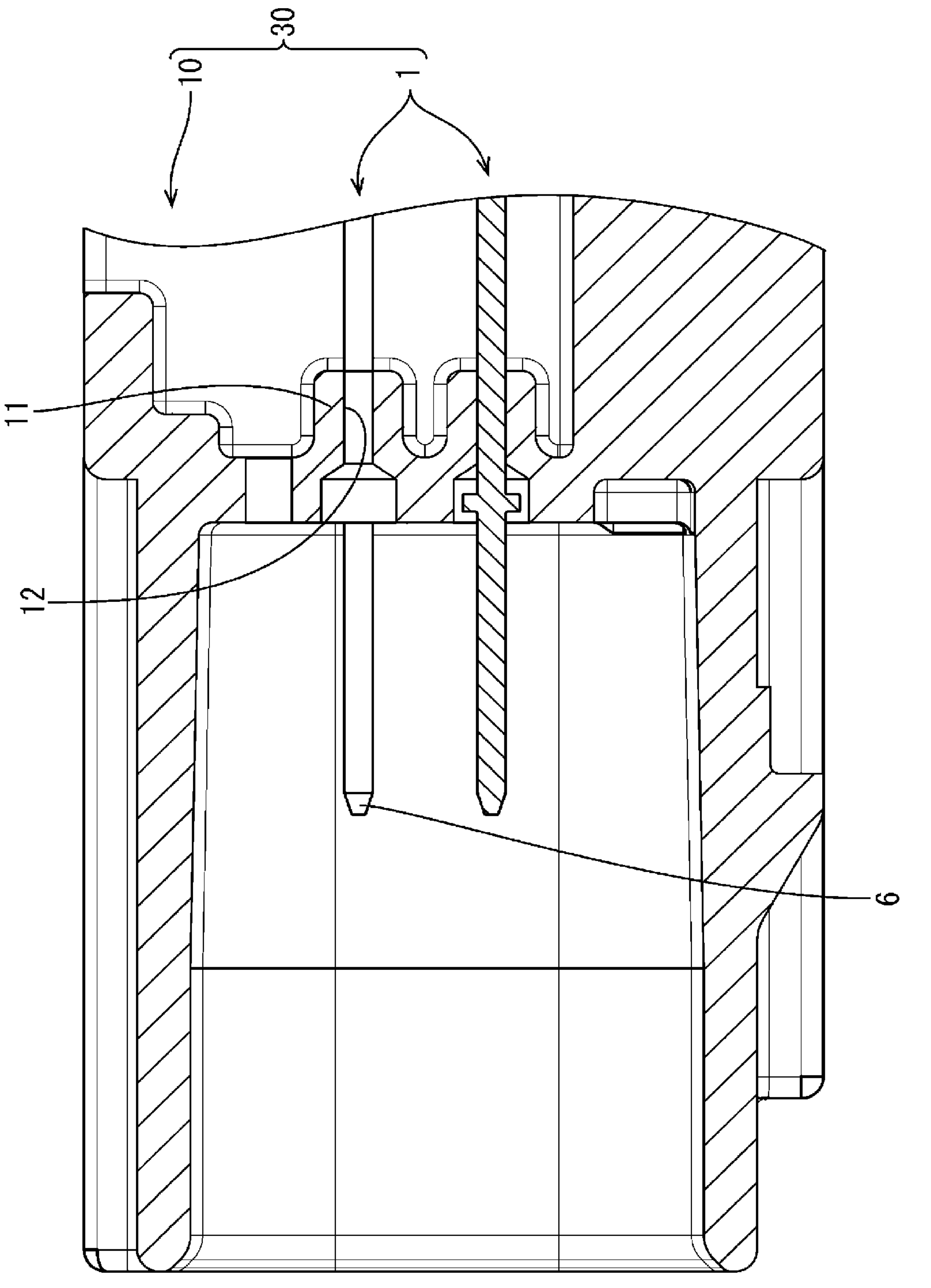
FIG. 8 is a section along C-C in FIG. 7.
Figure 9:
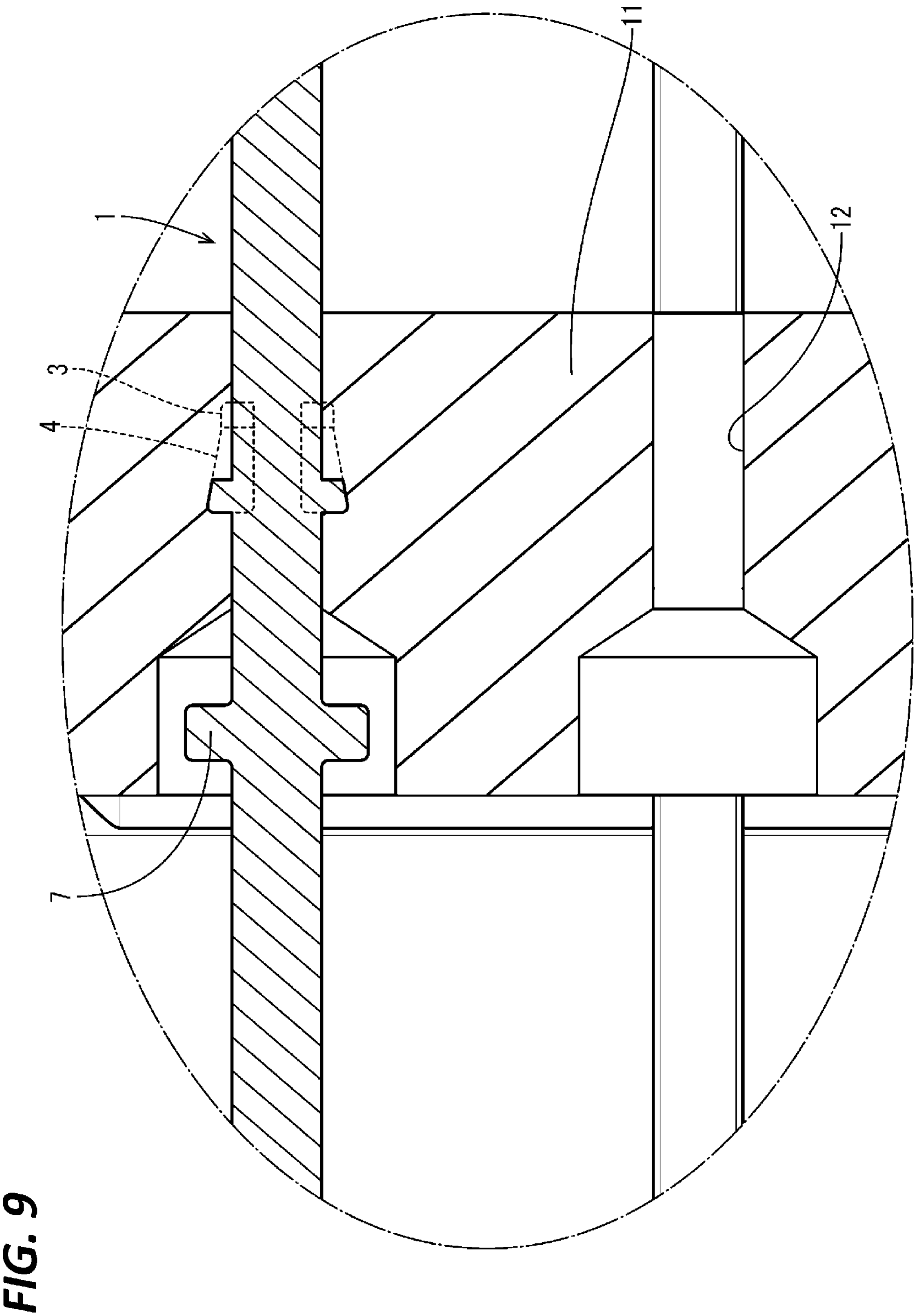
FIG. 9 is a section along D-D in FIG. 7.

A board connector 30 of this embodiment includes terminals 1 and a housing 10. As shown in FIGS. 7 to 9, the terminals 1 are press-fit into terminal holding holes 12 provided in a terminal holding wall 11 of the housing 10 and held by the inner walls of the terminal holding holes 12.

The terminal 1 is formed by press-working a metal rectangular wire material. FIG. 1 is a plan view of the terminal 1. In the following description, a rightward direction, an upward direction and a direction forward of the plane of FIG. 1 in FIG. 1 are referred to as a forward direction (forward direction along a press-fitting direction), a leftward direction and an upward direction. As shown in FIG. 1, the terminal 1 includes a terminal body 2 extending in a front-rear direction, first projections 3, second position 4 and a receiving portion 7. The second projections 4 are provided continuously with the first projections 3 behind the first projections 3 in the press-fitting direction. The receiving portion 7 is provided behind and away from the second projections 4 in the press-fitting direction, and projects further than the outer periphery of the terminal body 2 in both a lateral direction (vertical direction in FIG. 1) and a vertical direction (vertical direction in FIG. 3). A front end part of the terminal 1 in the press-fitting direction serves as a board connecting portion 5 to be connected to a circuit pattern (not shown) of a board by being inserted therethrough, and a rear end part of the terminal 1 in the press-fitting direction serves as an electrically connecting portion 6 to be connected to a mating terminal (not shown) (see FIG. 8).

Figure 3:
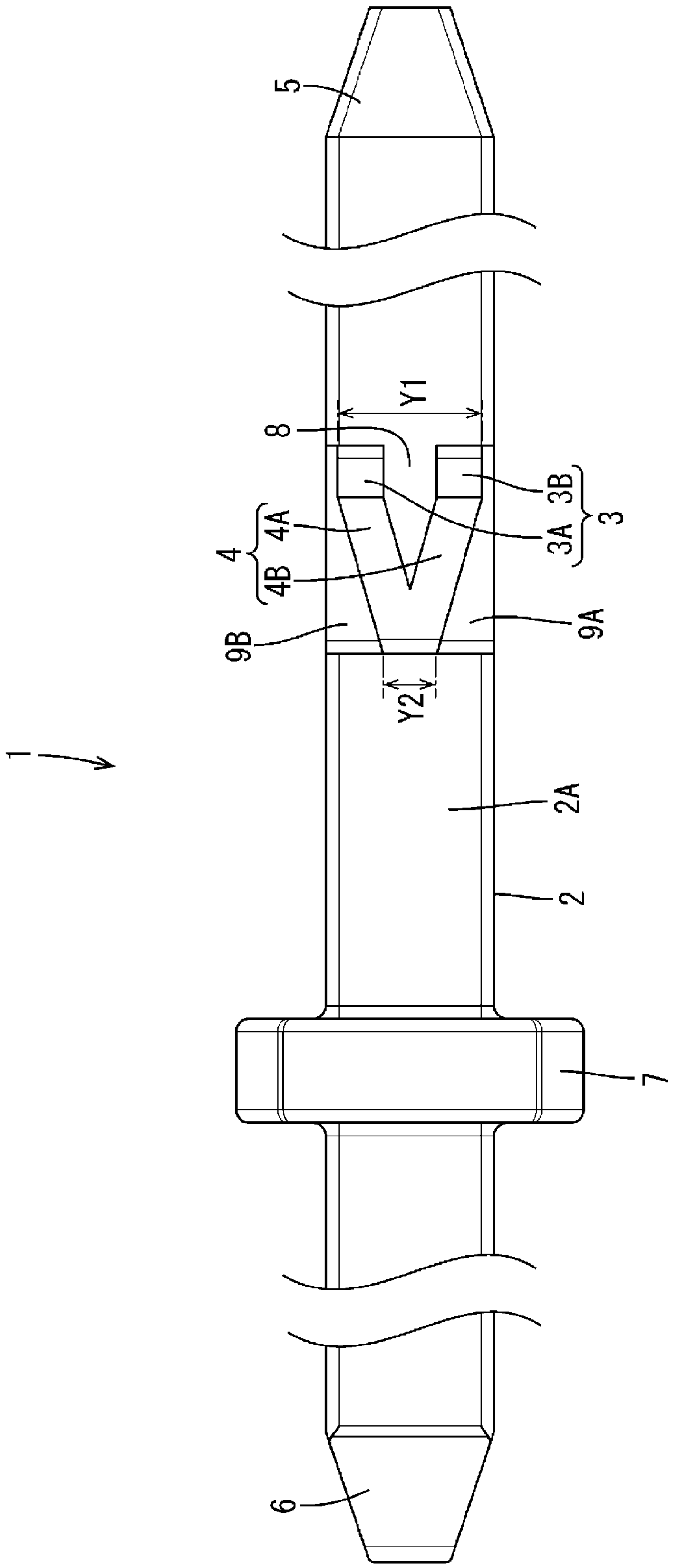
FIG. 3 is a side view of the terminal according to the embodiment.
Figure 4:
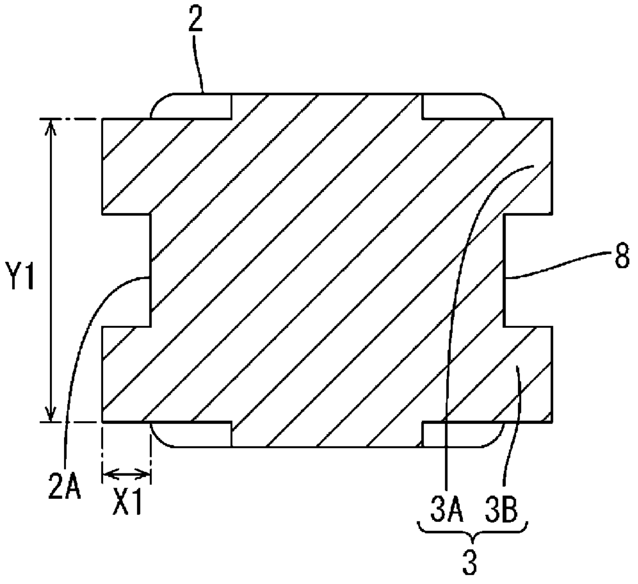
FIG. 4 is a section along A-A in FIG. 1.

FIG. 4 is a section when the terminal body 2 is cut to include the first projections 3 by a plane orthogonal to the front-rear direction. In the following description, a rightward direction, an upward direction and a direction backward of the plane of FIG. 4 in FIG. 4 are referred to as a rightward direction, an upward direction and a forward direction. As shown in FIG. 4, the first projections 3 project in the lateral direction of the terminal 1 and have a vertically and laterally symmetrical cross-sectional shape. The first projection 3 is divided into an upper first projection 3A and a lower first projection 3B, and a space between the upper and lower first projections 3A, 3B serves as a recess 8. If X1 denotes a projecting dimension of the first projection 3 from a side surface 2A of the terminal body 2 and Y1 denotes a thickness in the vertical direction, X1 and Y1 are both substantially constant values in the press-fitting direction (see FIGS. 1 and 3). A maximum value of X1, i.e. a maximum projecting dimension X1max of the first projection 3 from the side surface 2A of the terminal body 2 is as shown in FIG. 1.

Figure 2:
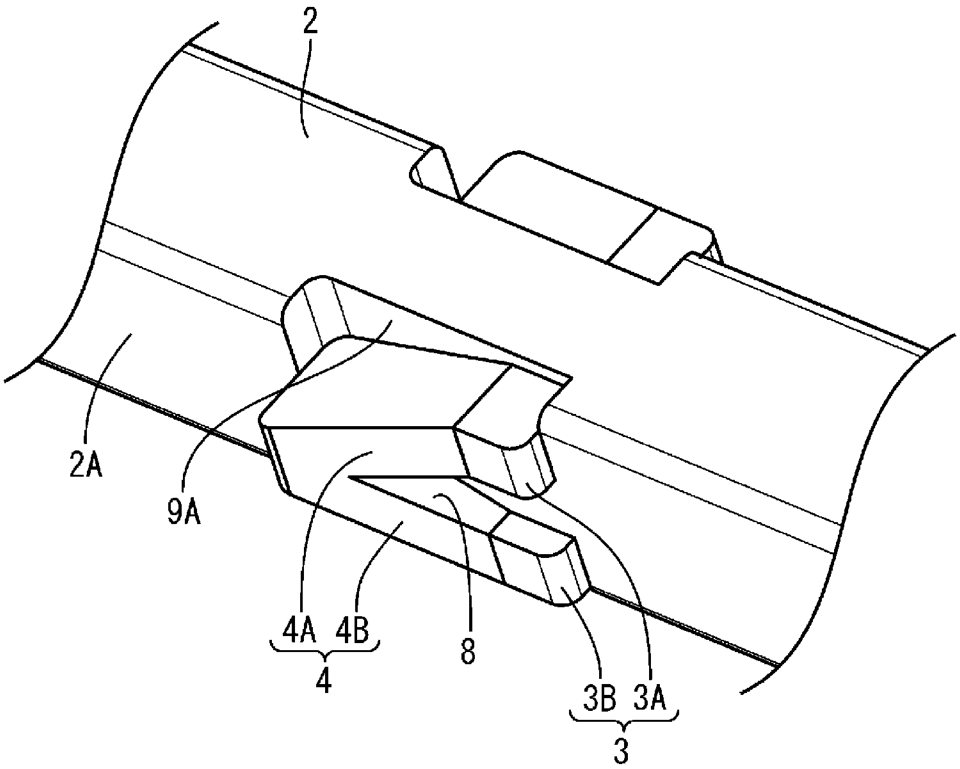
FIG. 2 is an enlarged perspective view of an essential part of the terminal according to the embodiment.
Figure 5:
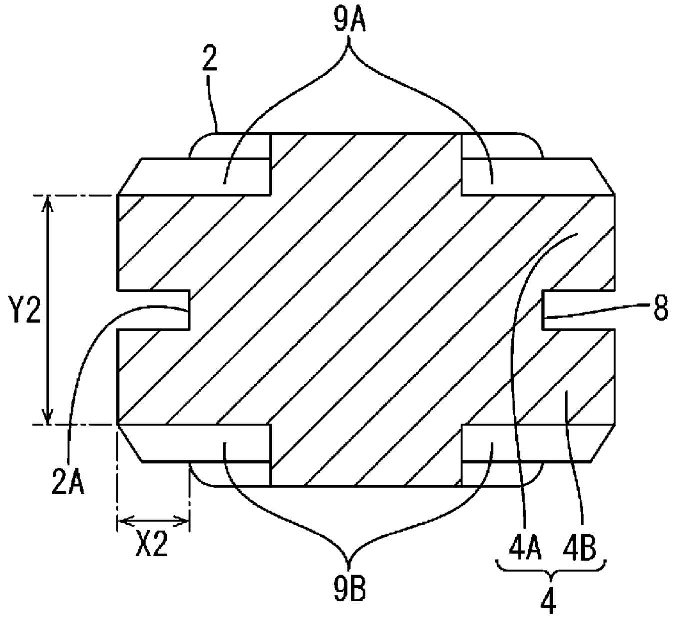
FIG. 5 is a section along B-B in FIG. 1.

FIG. 5 is a section when the terminal body 2 is cut to include the second projections 4 by a plane orthogonal to the front-rear direction. In the following description, a rightward direction, an upward direction and a direction backward of the plane of FIG. 5 in FIG. 5 are referred to as a rightward direction, an upward direction and a forward direction. As shown in FIG. 5, the second projections 4 project in the lateral direction of the terminal 1 and have a vertically and laterally symmetrical cross-sectional shape. The second projection 4 is divided into an upper second projection 4A and a lower second projection 4B, and a space between the upper and lower second projections 4A, 4B serves as the recess 8 continuous from the side of the first projection 3. If X2 denotes a projecting dimension of the second projection 4 from the side surface 2A of the terminal body 2 and Y2 denotes a thickness in the vertical direction, X2 increases (see FIG. 1) and Y2 decreases (see FIG. 3) toward a rear side in the press-fitting direction. A maximum value of X2, i.e. a maximum projecting dimension X2max of the second projection 4 from the side surface 2A of the terminal body 2 is as shown in FIG. 1. As shown in FIGS. 2 and 3, the upper second projection 4A and the lower second projection 4B are integrated and the recess 8 is closed in a rear end part of the second projection 4 in the press-fitting direction. A space above the upper second projection 4A of the second projection 4 and a space below the second projection 4B of the second projection 4 expanding toward the rear side in the press-fitting direction serve as an upper recess 9A and a lower recess 9B.

If the shapes of the first and second projections 3, 4 are compared, Y2 is smaller than Y1 (see FIG. 3) and the maximum value X2max of X2 is larger than the maximum value X1max of X1 (see FIG. 1).

Figure 6:
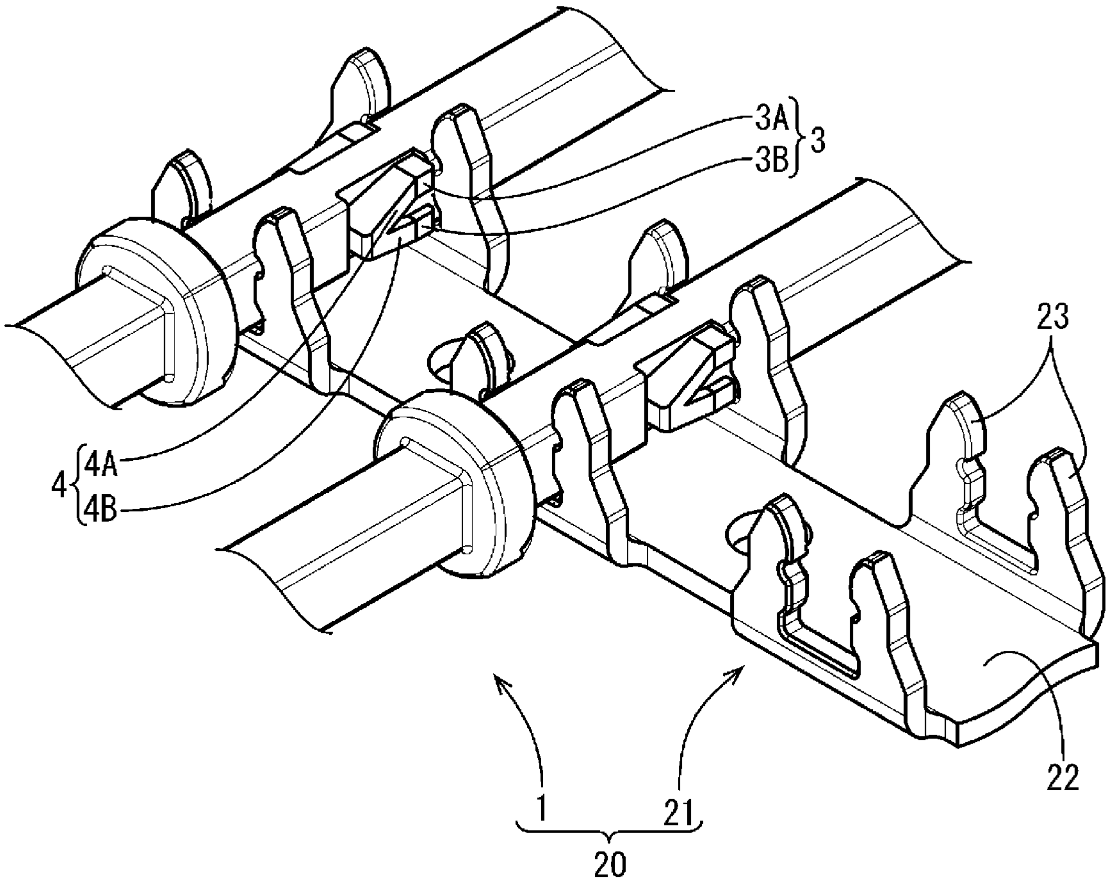
FIG. 6 is a perspective view of a terminal coupling body according to the embodiment.

The terminal coupling body 20 in which a plurality of the terminals 1 are held in parallel by a terminal holder 21 as shown in FIG. 6 is used to handle and transport the terminals 1. The terminal holder 21 includes a strip-like supporting base 22 and a plurality of supporting pieces 23 extending from the supporting base 22, and the terminals 1 are sandwiched by the supporting pieces 23. The terminal 1 is so mounted on the terminal holder 21 that a region including the first projections 3 and the second projections 4 is disposed on the supporting base 22.

The housing 10 is made of synthetic resin and includes a plurality of the terminal holding hole 12 in the terminal holding wall 11 as shown in FIGS. 7 to 9. The terminal holding hole 12 is formed such that the internal shape of the terminal holding hole 12 is the same as or somewhat larger than the external shape of the rectangular wire material used for the terminal 1 and the first and second projections 3, 4 are press-fit to the inner wall of the terminal holding hole 12 when the terminal is press-fit (see FIG. 9).

In press-fitting the terminal 1 into the housing 10, a press-fitting machine (not shown) is brought into contact with the receiving portion 7 from behind in the press-fitting direction and the terminal 1 is inserted into the terminal holding hole 12 by the press-fitting machine. At this time, the first and second projections 3, 4 bite into the terminal holding wall 11 while scraping the inner wall of the terminal holding hole 12 (see FIGS. 8 and 9). The terminal 1 is held in the vertical direction by the first projections 3 having a large vertical thickness and held in the lateral direction by the second projections 4 largely projecting in the lateral direction inside the housing 10. Further, the synthetic resin scraped off from the inner wall of the terminal holding hole 12 is filled into the recesses 8, whereby the terminal 1 is suppressed from rattling in the vertical direction, lateral direction and front-rear direction and rotating around the press-fitting direction and the terminal 1 is firmly held in the housing 10. The synthetic resin scraped off from the inner wall of the terminal holding hole 12 is also accommodated in the upper and lower recesses 9A, 9B and trapped inside the housing 10.

[Functions and Effects of Embodiment]

According to this embodiment, the following functions and effects are achieved.

The terminal 1 according to this embodiment is made of the rectangular wire material, extends in the front-rear direction, and is provided with the terminal body 2, the pair of first projections 3 provided to project toward both left and right sides from the both side surfaces 2A of the terminal body 2 and the pair of second projections 4 provided to project toward both left and right sides from the both side surfaces 2A of the terminal body 2 and disposed behind the pair of first projections 3, the pair of second projections 4 are continuously and integrally formed with the pair of first projections 3, and the maximum projecting dimension X2max of the second projection 4 from the side surface 2A of the terminal body 2 is larger than the maximum projecting dimension X1max of the first projection 3 from the side surface 2A of the terminal body 2.

According to the above configuration, when the terminal 1 is press-fit into the housing 10 and held inside the housing 10, the terminal 1 can be held by the first and second projections 3, 4. Further, since the first and second projections 3, 4 are integrated, the terminal 1 is easily miniaturized.

In this embodiment, the first projection 3 includes the upper first projection 3A located on an upper surface side of the terminal body 2 and the lower first projection 3B located on a lower surface side of the terminal body 2, the second projection 4 includes the upper second projection 4A continuously and integrally formed with the upper first projection 3A and the lower second projection 4B continuously and integrally formed with the lower first projection 3B, and the upper and lower second projections 4A, 4B approach each other toward the rear side and the projecting dimensions X2 thereof from the side surface 2A of the terminal body 2 increase toward the rear side.

According to the above configuration, in press-fitting the terminal 1 into the housing 10, the synthetic resin scraped off from the inner wall of the housing 10 is filled between the upper and lower second projections 4A, 4B, whereby the terminal 1 is more firmly held in the housing 10.

The terminal coupling body 20 of this embodiment includes the terminals 1 and the terminal holder 21 for holding the plurality of terminals 1 in parallel.

According to the above configuration, the terminals 1 are easily handled and transported.

The board connector 30 of this embodiment includes the terminals 1 and the housing 10 including the terminal holding wall 11 for holding the terminals 1.

According to the above configuration, the terminals 1 can be firmly held in the housing 10 during the use of the board connector 30. Further, since the terminals 1 can be miniaturized, the board connector 30 can be miniaturized or more multipolarized.

Other Embodiments (1) Although the board connecting portion 5 is provided on the front end part in the press-fitting direction and the electrically connecting portion 6 is provided on the rear end part in the press-fitting direction in the above embodiment, there is no limitation to this and these may be arranged reversely.

(2) Although the terminal 1 is so mounted on the terminal holder 21 that the region including the first and second projections 3, 4 is disposed on the supporting base 22 in the above embodiment, there is no limitation to this. For example, a terminal holder may be disposed in front of or behind the region including the first and second projections.

LIST OF REFERENCE NUMERALS

1: terminal
2: terminal body
2A: side surface
3: first projection
3A: upper first projection
3B: lower first projection
4: second projection
4A: upper second projection
4B: lower second projection
5: board connecting portion
6: electrically connecting portion
7: receiving portion
8: recess
9A: upper recess
9B: lower recess
10: housing
11: terminal holding wall
12: terminal holding hole
20: terminal coupling body
21: terminal holder
22: supporting base
23: supporting piece
30: board connector
X1: projecting dimension of first projection from side surface of terminal body
X1max: maximum projecting dimension of first projection from side surface of terminal body
X2: projecting dimension of second projection from side surface of terminal body
X2max: maximum projecting dimension of second projection from side surface of terminal body
Y1: vertical thickness of first projection
Y2: vertical thickness of second projection

What is claimed is:

1. A terminal made of a rectangular wire material and extending in a front-rear direction, comprising:

a terminal body;

a pair of first projections provided to project toward both left and right sides from both side surfaces of the terminal body; and a pair of second projections provided to project toward both left and right sides from the both side surfaces of the terminal body, the pair of second projections being disposed behind the pair of first projections, wherein:

the pair of second projections are continuously and integrally formed with the pair of first projections, a maximum projecting dimension of the second projection from the side surface of the terminal body is larger than a maximum projecting dimension of the first projection from the side surface of the terminal body, the first projection includes an upper first projection located on an upper surface side of the terminal body and a lower first projection located on a lower surface side of the terminal body, the second projection includes an upper second projection continuously and integrally formed with the upper first projection and a lower second projection continuously and integrally formed with the lower first projection, and a recess is defined between the upper first projection and the lower first projection and between the upper second projection and the lower second projection.

2. The terminal of claim 1, wherein:

the upper and lower second projections approach each other toward a rear side and projecting dimensions thereof from the side surface of the terminal body increase toward the rear side.

3. A terminal coupling body, comprising:

the terminal of claim 1; and a terminal coupling body for holding a plurality of the terminals in parallel.

4. A board connector, comprising:

the terminal of claim 1; and a housing including a terminal holding wall for holding the terminal.

5. The terminal of claim 1, wherein rear end portions of the upper second projection and the lower second projection are integrated, and the recess is closed in a rear end portion of the second projection.

6. The terminal of claim 1, wherein a dimension of the recess along a direction in which the upper first projection and the lower first projection face each other decreases toward the rear side.

* * * * *